2,822,386
Patented Feb. 4, 1958

2,822,386

PROCESS FOR STABILIZING STYRENE-SULFONATE SOLUTIONS

Sydney J. Nix, Jr., Waynesboro, Va., assignor to E. I. du Pont de Nemours and Company, Wilmington, Del., a corporation of Delaware No Drawing. Application March 1, 1955
Serial No. 491,520

6 Claims. (Cl. 260—505)

This invention relates to a process for the manufacture of styrenesulfonic acid or salts thereof. More particularly, it relates to inhibiting polymerization during storage of these acids or salts and to inhibiting color formation during their preparation and storage. It relates also to the provision of compositions in which the acids or salts thereof are stabilized.

For the production of dyeable acrylonitrile polymer fibers, yarns, fabrics, and the like various monoethylenically unsaturated compounds have been copolymerized with acrylonitrile. To give satisfactory affinity for basic dyes sulfonate groups have been introduced into the polymer, for instance, by adding an alkali metal salt of styrenesulfonic acid to the polymerization reaction. A very small amount of such compound copolymerized in the polymer confers excellent dyeability with basic dyestuffs. For example, substantially improved dyeability can be attained by the addition of as little as 0.1% potassium styrenesulfonate, especially when from 5 to 14.9% of a neutral monoethylenically unsaturated compound, such as methyl acrylate, is present in the terpolymer formed. Frequently, larger percentages of the alkali metal salt of styrenesulfonic acid are desired in the polymer; the acrylonitrile polymer may contain up to 5% or more styrenesulfonate salt with or without one or more additional copolymerizing compounds.

A typical and common method for the production of styrenesulfonic acid or salts in monomeric form, as, for example, potassium styrenesulfonate, involves the following reactions:

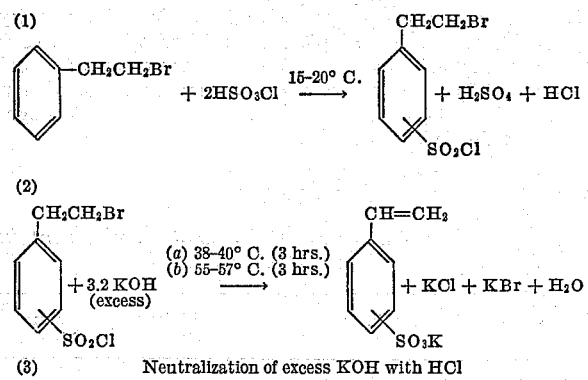

(3)  Neutralization of excess KOH with HCl

The chlorosulfonated product of the first reaction is isolated and then is added slowly (over a period of 2 hours at a reaction temperature of 38–40° C.) to excess KOH as shown in Reaction 2. The temperature is kept at 38–40° C. for one hour after the addition of the chlorosulfonated product is completed and then raised to 55–57° C. over a period of 15–30 minutes and held there for about three hours. It is important that the temperature control as indicated be strictly maintained in order to minimize polymerization of the monomer. After neutralization as shown in Reaction 3, the product is filtered (sulfonate by-product is removed) and is then ready for shipment. Other bases may be used in the neutralization and the free styrenesulfonic acids can be formed from the resultant salts. Potassium hydroxide will normally be used in step 2, and since the use of potassium salt of styrenesulfonic acid in the above mentioned acrylonitrile polymerizations leads to satisfactory dyeing, the potassium salt is generally used.

While it is possible to produce colorless styrenesulfonic acid or salts thereof, inhibitors are needed to prevent polymerization.

Salts of styrenesulfonic acid as prepared above or heretofore are colored and tend to darken or acquire additional color with time in storage and under certain conditions they polymerize during storage; thus, effectiveness is destroyed or reduced. Darkening or discoloration is carried over to polymers prepared from the monomers, as for example, the acrylonitrile polymers described above, with the result that even though only a minor proportion is present in the final product adverse effects appear.

Accordingly, it is an object of this invention to provide an improved process for the manufacture of styrenesulfonic acid or its salt which process gives a product improved in color and which inhibits excessive color development in the styrenesulfonate monomer during storage and at the same time protects the monomer against excessive polymerization. Other objects will be apparent from the description that follows.

The objects of this invention are accomplished by adding to styrenesulfonic acid or its salts, such as the potassium salt of the styrenesulfonic acid, a small amount of sodium nitrite or other alkali or alkaline earth metal salt or the ammonium salt of nitrous acid. Although the nitrite can be added during the formation of the monomer, by far the best results are obtained by adding the nitrite to the styrenesulfonic acid salt reaction mixture immediately or shortly after the final neutralization (step 3 above). Thus, after the styrenesulfonic acid compound has been prepared by removing the elements of hydrogen and halogen from a sulfonated beta-phenylethyl halide through the action of an alkali, excess alkali is neutralized with an acid, such as hydrochloric acid, and immediately or shortly thereafter, an inhibitor of this invention is added. By this improved process new compositions comprising styrenesulfonic acid compounds and nitrous acid compounds are produced. The color of the former and the color of polymers therefrom are greatly improved, and the styrenesulfonic acid groups are effectively stabilized against undesired polymerization during storage.

In the ordinary manufacture of potassium styrenesulfonate, as outlined above, an inhibitor such as hydroquinone is normally introduced so that it is present during the final step of the reaction. When sodium nitrite is used in this manner, that is, added at the start of Reaction 2, the color of the final product is orange-yellow. Under the same circumstances, hydroquinone gives a light brown product. However, when sodium nitrite is added after the neutralization step (Reaction 3), the product is very much improved in color whereas hydroquinone under similar conditions results in a badly discolored product.

The following data in Table I were obtained by varying the inhibitor and the stage in the reaction cycle at which the addition was made.

TABLE I

*Effect of $NaNO_2$ as a stabilizer for potassium salt of $SSA^1$*

| Percent PSS[2] as made (in water) | Appearance when made | Stabilizer | Percent Stabilizer (based on PSS) | Stabilizer (when added) | Hazen No. of 1% sol'n as SSA[1] (After 11 months' storage) |
|---|---|---|---|---|---|
| 10 | Very light yellow | $NaNO_2$ | 1.0 | Final product (after reaction 3). | 35 |
| 10 | ----do---- | $NaNO_2$ | 1.3 | ----do---- | 38 |
| 10 | Orange-yellow | $NaNO_2$ | 1.3 | Before final reaction (during reaction 2). | 105 |
| 10 | Light brown | Hydroquinone | 0.76 | ----do---- | 80 |
| 10 | Dark brown | ----do---- | 0.79 | Final product (after reaction 3). | 1,400 |

[1] SSA—styrenesulfonic acid.
[2] PSS—potassium styrenesulfonate.

From these data it is readily apparent that sodium nitrite is much more effective in preventing color formation during storage than is hydroquinone. Also, when added after Reaction 3 it is at least twice as effective as when added earlier in the process. In contrast, hydroquinone was much more effective when it was added before the neutralization or final reaction than when it was added after Reaction 3, but it is much less effective than the nitrite even in this instance.

As mentioned above, colorless or substantially colorless monomer (Hazen No.=8) can be obtained without any stabilizer. Thus, if trace amounts of substances that tend to catalyze polymerization could be eliminated with certainty, there would be no need for the added inhibitor. But such elimination processes are expensive and in the storage and handling of the monomer in economical operations an inexpensive, reliable method, as provided by this invention, is desired.

In Table II below is shown a few tests on the effectiveness of the inhibitors of this invention against polymerization. Here, polymerization is purposely induced by the addition of 2% hydrogen peroxide based on the amount of potassium styrenesulfonate present and by maintaining the temperature of the test solutions at 60° C. in order to accelerate the tests.

TABLE II

*Effectiveness of various polymerization inhibitors*

| Initial Conc., Percent PSS in water | Inhibitor and conc. based on PSS | Measured After— | Final conc., PSS | Percent loss, PSS |
|---|---|---|---|---|
| 9.51 | none | 18 hrs | 0 | 100 |
| 9.69 | Hydroquinone—0.70% | 18 hrs | 0 | 100 |
| 9.86 | $NaNO_2$—1.05% | 18 hrs | 4.22 | 57 |
| 9.86 | $NaNO_2$—1.05% | 42 hrs | 4.0 | 60 |

In all probability the times for complete consumption of the monomer having no inhibitor and for that having hydroquinone as an inhibitor were substantially less than 18 hours, since these test samples were aged overnight and examined the following morning. In any event, sodium nitrite is shown to be a very effective polymerization inhibitor under these drastic adverse conditions.

Another series of short aging tests gave a comparison of sodium nitrite with several different inhibitors normally effective for vinyl monomers. In these tests the solutions (10% potassium styrenesulfonate in water) were adjusted to a pH of 5 and of 9. Aging was for 24 hours at room temperature.

TABLE III

*Effect of stabilizers on color*

| Inhibitor | Conc'n. Inhibitor (on PSS), percent | Color[1] | |
|---|---|---|---|
| | | pH 5 | pH 9 |
| Hydroquinone | 0.7 | LY | DB |
| Hydroquinone monomethyl ether | 0.7 | C | LB |
| t-Butyl catechol | 0.7 | LY | B |
| Sodium nitrite | 0.7 | LY | C |

[1] L=light; C=colorless; Y=yellow; B=brown; D=dark.

Increasing pH increased discoloration with hydroquinone, hydroquinone monomethyl ether, and t-butyl catechol, but decreased discoloration with sodium nitrite. This is of decided importance, because the styrenesulfonic acid compound is best prepared and used as the potassium salt.

An important consideration is the effect the inhibitor or monomer containing it has on the polymer and on the yarn or fibers made therefrom. To determine this two polymers were prepared using for one a sample of potassium styrenesulfonate containing 0.91% of hydroquinone and for the other potassium styrenesulfonate containing 1.3% of sodium nitrite. The polymers were substantially of the same composition, being composed of 94% acrylonitrile, 5.3% methyl acrylate and 0.7% potassium styrenesulfonate, the amount of inhibitor being small and about the same in each case. They were prepared by the same procedure to give an intrinsic viscosity in both cases of about 1.3 and were processed into yarn under identical conditions. Color measurements (optical density of a 5.8% solution in N,N-dimethylformamide at 25° C. for 400 millimicrons) were made at several stages as recorded in Table IV.

TABLE IV

*Effect of PSS stabilizer on the color development in AN/MA/SSA polymers*

| PSS Stabilizer | Hydroquinone | Sodium Nitrite |
|---|---|---|
| Color Value: | | |
| Ground polymer | 7.2 | 5.0 |
| Solution (after filtration) | 61.0 | 30.0 |
| Yarn (as-drawn) | 59.0 | 40.0 |

Much improved color was obtained when the potassium styrenesulfonate contained sodium nitrite even though the polymer was composed of only a small amount (0.7%) potassium styrenesulfonate. Normal color values for drawn yarn from polymers containing 94% acrylonitrile and 6% methyl acrylate will range from about 30 to 35. Thus, readily dyeable yarn containing the sulfonic acid dye sites and having color approximating that of parent polymer is achieved.

Only a small proportion of nitrous acid compound need be used to inhibit the sulfonic acid compound effectively against color development, for example, from about 0.5% to about 5% based on the weight of the sulfonic acid compound, such as the alkali metal salt. Generally, about 1% to 2% is preferred. In place of sodium nitrite, potassium, lithium, rubidium, cesium, beryllium, magnesium, calcium, barium, or ammonium nitrite or nitrous acid itself may be used with equivalent results. Also, such salts as the sodium or lithium salts of styrenesulfonic acid may be prepared and these may be used in much the same way as described for potassium styrenesulfonate.

The lighter colored fibers, yarns and fabrics thus produced are eminently suited to fabrication into textile goods that may be brightly dyed with basic dyestuffs in pastel shades or in full deep shades as desired. Not only is the color of the yarns and fibers improved but the styrenesulfonic acid compound is maintained in its monomeric state without substantial loss by polymerization in storage.

Any departure from the above description which conforms to the claims is intended to be included within their scope.

I claim:
1. In the preparation of a styrenesulfonic acid compound by the removal of the elements hydrogen and halogen from a sulfonated beta-phenylethyl halide through the action of an alkali, the improvement comprising adding to the monomeric styrenesulfonic acid compound so prepared a salt of nitrous acid, said addition being effected after neutralization of excess alkali.

2. The process of claim 1 wherein said salt of nitrous acid is an alkali metal salt of nitrous acid.

3. The process of claim 1 wherein there is added from about 0.5% to about 5% of said salt of nitrous acid based on the weight of said styrene sulfonic acid compound.

4. The process of claim 1 wherein said styrenesulfonic acid compound is potassium styrenesulfonate.

5. The process of claim 1 wherein said salt of nitrous acid is sodium nitrite.

6. The process of claim 1 wherein said sulfonated beta-phenylethyl halide is sulfonated beta-phenylethyl bromide.

References Cited in the file of this patent
UNITED STATES PATENTS

| | | |
|---|---|---|
| 2,159,263 | Fordyce et al. | May 23, 1939 |
| 2,607,081 | Taylor | Aug. 19, 1952 |